(12) United States Patent
Sugio et al.

(10) Patent No.: US 9,656,198 B2
(45) Date of Patent: May 23, 2017

(54) OIL SEPARATOR

(71) Applicant: NABTESCO AUTOMOTIVE CORPORATION, Tokyo (JP)

(72) Inventors: Takuya Sugio, Tokyo (JP); Ichiro Minato, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 38 days.

(21) Appl. No.: 14/380,830

(22) PCT Filed: Feb. 27, 2013

(86) PCT No.: PCT/JP2013/055189
§ 371 (c)(1),
(2) Date: Aug. 25, 2014

(87) PCT Pub. No.: WO2013/129497
PCT Pub. Date: Sep. 6, 2013

(65) Prior Publication Data
US 2015/0033685 A1 Feb. 5, 2015

(30) Foreign Application Priority Data

Feb. 27, 2012 (JP) ................. 2012-040583
Oct. 31, 2012 (JP) ................. 2012-241234

(51) Int. Cl.
*B01D 45/08* (2006.01)
*F01M 13/04* (2006.01)
(Continued)

(52) U.S. Cl.
CPC ............. *B01D 45/08* (2013.01); *F01M 11/08* (2013.01); *F01M 2013/0072* (2013.01);
(Continued)

(58) Field of Classification Search
CPC ........ B01D 45/02; B01D 45/04; B01D 45/08; F01M 11/08; F01M 2013/0433;
(Continued)

(56) References Cited

U.S. PATENT DOCUMENTS 2,082,863 A 6/1937 Weisgerber
2,756,837 A 7/1956 Lovelady et al.
(Continued)

FOREIGN PATENT DOCUMENTS

CN 1248480 A 3/2000
CN 1874920 A 12/2006
(Continued)

OTHER PUBLICATIONS

English Translation of Japanese Notification of Reasons for Refusal issued on Aug. 25, 2015 in connection with Japanese Patent Appln. No. JP2012-040580, 4 pages.

(Continued)

*Primary Examiner* — Robert Clemente
(74) *Attorney, Agent, or Firm* — Wolf, Greenfield & Sacks, P.C.

(57) ABSTRACT

An oil separator is provided with a housing having an inlet for air, and an expansion chamber located inside the housing. The oil separator introduces air containing oil that has passed through the inlet into the housing, and separates and recovers the oil from the introduced air. The transverse cross-sectional area of the expansion chamber is larger than the opening area of the inlet. The oil separator is further provided with a collected liquid storage portion that is located below the expansion chamber and collects the separated oil, a liquid communication portion having a communication hole that connects the expansion chamber to the collected liquid storage portion, and a mounting and dis- (Continued)

mounting mechanism for mounting and dismounting the collected liquid storage portion to and from the housing.

6 Claims, 10 Drawing Sheets

(51) Int. Cl.
    *F01M 11/08*     (2006.01)
    *F01M 13/00*     (2006.01)

(52) U.S. Cl.
    CPC ............... *F01M 2013/0433* (2013.01); *F01M 2013/0438* (2013.01); *F01M 2013/0477* (2013.01)

(58) Field of Classification Search
    CPC ..... F01M 2013/0438; F01M 2013/045; F01M 2013/0461; F01M 2013/0477; F01M 2013/0072
    See application file for complete search history.

(56) References Cited

U.S. PATENT DOCUMENTS

| | | |
|---|---|---|
| 2,776,054 A | 1/1957 | Hirshstein |
| 2,942,691 A | 6/1960 | Dillon |
| 2,966,233 A | 12/1960 | Nelson |
| 3,000,467 A | 9/1961 | Bowers |
| 3,075,336 A | 1/1963 | Hays |
| 3,201,924 A | 8/1965 | Fulford et al. |
| 3,432,991 A | 3/1969 | Sauder et al. |
| 4,167,164 A | 9/1979 | Bachmann |
| 4,226,726 A | 10/1980 | Rehm |
| 4,298,465 A | 11/1981 | Druffel |
| 4,534,861 A | 8/1985 | Wedemeyer et al. |
| 4,541,933 A | 9/1985 | Armold et al. |
| 4,627,406 A * | 12/1986 | Namiki .................. F01M 13/04 123/572 |
| 4,668,256 A | 5/1987 | Billiet et al. |
| 4,892,569 A | 1/1990 | Kojima |
| 5,024,203 A | 6/1991 | Hill |
| 5,171,130 A | 12/1992 | Kume et al. |
| 6,058,917 A | 5/2000 | Knowles |
| 6,302,933 B1 | 10/2001 | Krause et al. |
| 6,626,163 B1 | 9/2003 | Busen et al. |
| 8,540,809 B2 | 9/2013 | Minato et al. |
| 9,017,460 B2 | 4/2015 | Minato et al. |
| 2002/0129586 A1 | 9/2002 | Tanaka |
| 2003/0110949 A1 | 6/2003 | Fornof et al. |
| 2003/0172632 A1 | 9/2003 | Matsubara et al. |
| 2004/0040273 A1 | 3/2004 | Lewin |
| 2004/0238452 A1 | 12/2004 | Moore |
| 2005/0092180 A1 | 5/2005 | Fornof et al. |
| 2005/0188848 A1 | 9/2005 | Salzman et al. |
| 2006/0130654 A1 | 6/2006 | King et al. |
| 2006/0248921 A1 | 11/2006 | Hosford et al. |
| 2006/0254566 A1 | 11/2006 | Yasuhara |
| 2007/0175186 A1 | 8/2007 | Braziunas |
| 2007/0181472 A1 | 8/2007 | Dawes et al. |
| 2007/0215128 A1 | 9/2007 | Yonebayashi et al. |
| 2008/0011550 A1 | 1/2008 | Dunn et al. |
| 2008/0105125 A1 | 5/2008 | Lauson et al. |
| 2009/0056292 A1 | 3/2009 | Fornof et al. |
| 2009/0071188 A1 | 3/2009 | Kusada et al. |
| 2009/0193770 A1 | 8/2009 | Holzmann et al. |
| 2010/0006075 A1 | 1/2010 | Ruppel et al. |
| 2010/0178236 A1 | 7/2010 | Rameshni et al. |
| 2010/0229510 A1 | 9/2010 | Heinen et al. |
| 2011/0088641 A1 | 4/2011 | Shudo et al. |
| 2011/0113738 A1 | 5/2011 | Zachos |
| 2011/0179755 A1* | 7/2011 | Gruhler .................. B29C 65/58 55/320 |
| 2012/0060452 A1 | 3/2012 | Sikkenga et al. |
| 2012/0174537 A1 | 7/2012 | Tornblom et al. |
| 2012/0180442 A1 | 7/2012 | Siber et al. |
| 2012/0186451 A1 | 7/2012 | Duesel, Jr. et al. |
| 2013/0167719 A1 | 7/2013 | Alper |
| 2014/0345461 A1 | 11/2014 | Sikkenga et al. |
| 2016/0008741 A1 | 1/2016 | Beg et al. |

FOREIGN PATENT DOCUMENTS

| | | |
|---|---|---|
| CN | 201221882 Y | 4/2009 |
| CN | 102317585 A | 1/2012 |
| DE | 742669 C | 12/1943 |
| DE | 10 2004 016742 B3 | 9/2005 |
| DE | 10 2006 008516 A1 | 8/2007 |
| DE | 102011002582 A1 | 9/2011 |
| GB | 2033247 A | 5/1980 |
| JP | S47-029633 B | 8/1972 |
| JP | S52 13336 U | 1/1977 |
| JP | S53-122007 A | 10/1978 |
| JP | S57 181913 A | 11/1982 |
| JP | 58-64812 U | 5/1983 |
| JP | S59109284 A | 6/1984 |
| JP | 60-84714 U | 6/1985 |
| JP | S62-071322 U | 5/1987 |
| JP | S62-99313 | 6/1987 |
| JP | 1-84725 U | 6/1989 |
| JP | 1-114025 U | 8/1989 |
| JP | 1-156729 U | 10/1989 |
| JP | 2-48125 U | 4/1990 |
| JP | 2-133419 U | 11/1990 |
| JP | H2-147212 | 12/1990 |
| JP | 3-30813 A | 2/1991 |
| JP | H03-164584 A | 7/1991 |
| JP | 3-246149 A | 11/1991 |
| JP | H03-115028 U | 11/1991 |
| JP | H04-27780 A | 1/1992 |
| JP | 4-59321 U | 5/1992 |
| JP | 4-70970 U | 6/1992 |
| JP | 4-78481 U | 7/1992 |
| JP | 05-037628 U | 5/1993 |
| JP | H05-83382 U | 11/1993 |
| JP | H05-296173 A | 11/1993 |
| JP | 63-157234 U | 5/1994 |
| JP | 2-106526 U | 11/1994 |
| JP | 6-330720 A | 11/1994 |
| JP | H06-346855 A | 12/1994 |
| JP | 7-4880 U | 1/1995 |
| JP | H07-197886 A | 1/1995 |
| JP | 07-013418 U | 3/1995 |
| JP | H07-227514 A | 8/1995 |
| JP | 7-243318 A | 9/1995 |
| JP | 7-269326 A | 10/1995 |
| JP | H08-073740 A | 7/1996 |
| JP | H08-233415 A | 9/1996 |
| JP | 8-290027 A | 11/1996 |
| JP | 9-177532 A | 7/1997 |
| JP | H10-323529 A | 12/1998 |
| JP | H11-108474 A | 4/1999 |
| JP | 2000045749 A | 2/2000 |
| JP | 2000-282839 A | 10/2000 |
| JP | 2002-97919 A | 4/2002 |
| JP | 2002-544421 A | 12/2002 |
| JP | 2003-531330 A | 10/2003 |
| JP | 2003-322084 A | 11/2003 |
| jp | 2004-232625 | 8/2004 |
| JP | 2006-316641 A | 11/2006 |
| JP | 2007-016664 A | 1/2007 |
| JP | 2007-247623 A | 9/2007 |
| JP | 2007-255397 A | 10/2007 |
| JP | 2008-2377 A | 1/2008 |
| JP | 2008-19857 A | 1/2008 |
| JP | 2009-109102 A | 2/2009 |
| JP | 2010-017823 | 1/2010 |
| JP | 2010-501788 A | 1/2010 |
| JP | 2010-270743 A | 12/2010 |
| JP | 2011-085118 A | 4/2011 |
| JP | 2011-157927 A | 8/2011 |
| JP | 10-296038 A | 11/2014 |
| WO | WO 88/02658 A1 | 4/1988 |
| WO | WO 00/68548 | 11/2000 |

(56) References Cited

FOREIGN PATENT DOCUMENTS

| WO | WO 01/52973 A1 | 7/2001 |
|---|---|---|
| WO | WO 01/79664 A1 | 10/2001 |
| WO | WO 2007/036560 A1 | 4/2007 |

OTHER PUBLICATIONS

Translation of Written Opinion for related patent application PCT/JP2013/055189, dated May 21, 2013, pp. 1-6.
First Office Action issued by the State Intellectual Property Office of the People's Republic of China and English translation thereof, issued on Nov. 3, 2015 in connection with Chinese Application No. 201380010722.9, 12 pages.
English Translation of Japanese Notice of Reasons for Refusal issued on Nov. 24, 2015 in connection with Japanese Patent Appln. No. 2012-040584, 6 pages.
Supplemental European Search Report mailed on Dec. 22, 2015 in connection with European Application No. EP 13755024, 7 pages.
English Translation of Japanese Notice of Reasons for Refusal issued on Dec. 1, 2015 in connection with Japanese Patent Appln. No. 2012-040583, 4 pages.
European Search Report in corresponding application No. EP 13755157.8, dated Dec. 15, 2015, pp. 1-8.
Partial Supplementary European Search Report mailed on Jan. 26, 2016 in connection with European Application No. EP 13754685, 7 pages.
English Translation of Japanese Notice of Reasons for Refusal mailed on Feb. 2, 2016 in connection with Japanese Patent Appln. No. 2012-147748, 6 pages.
Non-Final Office Action issued by the U.S. Patent and Trademark Office on Apr. 22, 2016 in connection with U.S. Appl. No. 14/410,992, 17 pgs.
English Translation of Japanese Notification of Reasons for Refusal issued on Apr. 26, 2016 in connection with Japanese Patent Appln. No. 2012-106869, 9 pages.
Extended European Search Report mailed on Jul. 5, 2016 in connection with European Application No. EP 13813863, 6 pages.
Non-Final Office Action issued by the U.S. Patent and Trademark Office on Aug. 1, 2016 in connection with U.S. Appl. No. 14/399,485, 28 pages.
Extended European Search Report mailed on Aug. 16, 2016 in connection with European Application No. EP 13788303, 10 pages.
Non-Final Office Action issued by the U.S. Patent and Trademark Office on Sep. 27, 2016 in connection with U.S. Appl. No. 14/380,847, 13 pages.
Non-Final Office Action issued by the U.S. Patent and Trademark Office on May 25, 2016 in connection with U.S. Appl. No. 14/380,810.
Extended European Search Report mailed on Jun. 24, 2016 in connection with European Application No. EP 13754685, 9 pages.
Japanese Office Action for Application No. 2012-147748 dated Sep. 27, 2016.
Japanese Office Action for Application No. 2012-241234 dated Oct. 6, 2016.
Japanese Office Action for Application No. 2013-036394 dated Oct. 3, 2016.
Office Action for U.S. Appl. No. 14/399,485, mailed Jan. 4, 2017.

\* cited by examiner

OIL SEPARATOR

TECHNICAL FIELD OF THE INVENTION

The present invention relates to an oil separator.

BACKGROUND ART OF THE INVENTION

Vehicles such as trucks, buses, and construction machines utilize compressed air sent from a compressor, which is directly connected to an engine, to control systems such as brakes and suspensions. The compressed air contains water, which is contained in the atmosphere, and oil for lubricating the interior of the compressor. When the compressed air containing water and oil enters inside the systems, it causes rust and swelling of rubber members (such as O-rings) and results in an operational defect. Thus, an air dryer is provided downstream of the compressor in an air system for removing water and oil from the compressed air (for example, Patent Document 1).

A filter and a desiccant such as silica gel and zeolite are provided in the air dryer. The air dryer performs dehumidification to remove water from compressed air and regeneration to regenerate the desiccant by removing the water absorbed by the desiccant and discharging it to the outside.

PRIOR ART DOCUMENT

Patent Document

Patent Document 1: Japanese Laid-Open Patent Publication No. 10-296038

SUMMARY OF THE INVENTION

The air discharged from the air dryer during regeneration of the desiccant contains oil together with water. Considering the burden on the environment, an oil separator may be provided downstream of the compressor in the air system. This oil separator performs allows air that contains oil to strike an impingement member provided in the housing to separate the oil from the air and recover the oil. The oil separator then discharges cleaned air.

Since liquid containing the separated oil is stored in the housing of the oil separator together with water, the interior of the casing needs to be cleaned and the impingement member needs to be replaced periodically. Thus, there is a demand for an oil separator that allows the housing to be easily separated from the oil separator.

Accordingly, it is an objective of the present invention to provide an oil separator that allows the housing to be easily separated from the oil separator.

To achieve the foregoing objective and in accordance with one aspect of the present invention, an oil separator is provided that includes a housing including an inlet for air and an expansion chamber provided in the housing. The oil separator introduces air containing oil into the housing through the inlet to separate and recover the oil from the introduced air. The transverse cross-sectional area of the expansion chamber is greater than the opening area of the inlet. The oil separate further includes a collected liquid storage portion, a liquid communication portion, and a mounting and dismounting mechanism. The collected liquid storage portion is located below the expansion chamber. The collected liquid storage portion stores the separated oil. The liquid communication portion has a communication hole that connects the expansion chamber and the collected liquid storage portion with each other. The mounting and dismounting mechanism mounts the collected liquid storage portion to and dismounts the collected liquid storage portion from the casing.

In accordance with another aspect of the present invention, an oil separator is provided that includes a lid including an inlet for introducing purge air from an air dryer and an outlet for discharging cleaned air, a plurality of expansion chambers arranged next to one another in a vertical direction, a housing mountable to the lid; and a mounting and dismounting mechanism for allowing the lid to be detachable with respect to the housing. The oil separator causes the purge air to flow into the housing and strike an impingement member to separate oil from the purge air, thereby recovering liquid containing oil, and the oil separator discharges cleaned air. A through hole, which permits the purge air introduced through the inlet to flow vertically downward, is formed between the expansion chambers.

DETAILED DESCRIPTION OF THE PREFERRED EMBODIMENTS

An oil separator according to a first embodiment will now be described with reference to FIGS. 1 to 6. The oil separator is applied to an exhaust system of an air dryer.

Figure 1:
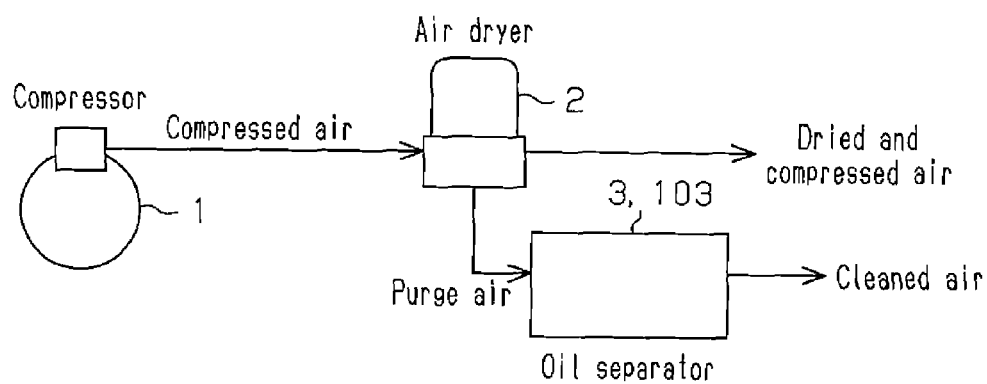
FIG. 1 is a block diagram illustrating an installation position of an oil separator according to a first embodiment of the present invention in an air system.

As shown in FIG. 1, vehicles such as trucks, buses, and construction machines utilize compressed air sent from a compressor 1 to control systems such as brakes and suspensions. Thus, an air dryer 2, which removes oil and water in the compressed air and provides dried air, is located downstream of the compressor 1 of an air system. A desiccant is provided in the air dryer 2. The air dryer 2 performs dehumidification to remove oil and water from the compressed air, and regeneration to regenerate the desiccant by removing the oil and the water absorbed by the desiccant and discharging them to the outside.

In the present embodiment, since air (purge air) discharged from the air dryer 2 during regeneration of the desiccant includes oil together with water, an oil separator 3 is provided downstream of the compressor 1 of the air system considering the burden on the environment. In particular, the oil separator 3 is provided in an exhaust system of the air dryer 2, and separates and recovers the oil and the water from purge air discharged during regeneration of the desiccant in the air dryer 2.

The oil separator 3 is an impingement plate-type oil separator and includes, inside the housing, impingement plates, against which air containing oil and water strikes. The impingement plate-type oil separator 3 performs gas/liquid separation by allowing the air containing oil and water to strike the impingement plates. In this manner, the oil separator 3 recovers oil from air, and discharges cleaned air.

Figure 2:
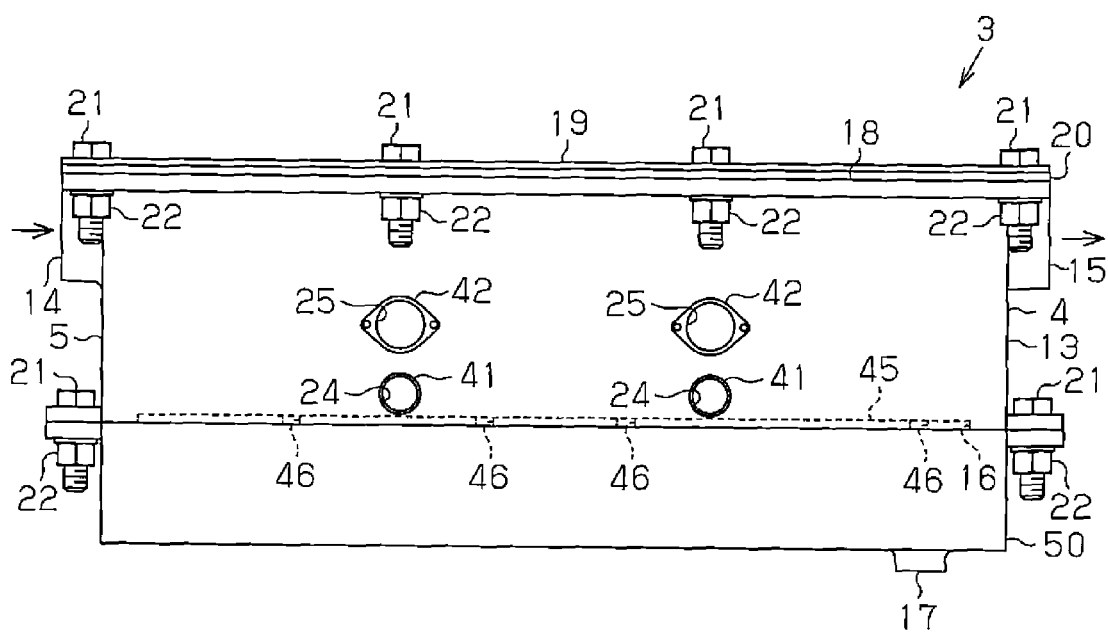
FIG. 2 is a side view illustrating the external structure of the oil separator of FIG. 1.

As shown in FIG. 2, the oil separator 3 includes a rectangular parallelepiped housing 4, which extends in the horizontal direction. An inlet 14 and an outlet 15 are respectively formed in a front side 5 and a rear side 13 of the housing 4. The front side 5 and the rear side 13 are opposed to each other in the longitudinal direction. That is, air passes through the oil separator 3 from left to right in FIG. 2.

An opening portion 16 is formed in the bottom face of the housing 4. A collected liquid storage portion 50, which stores liquid that is separated from the air and collected, is mounted on the bottom face of the housing 4 with bolts 21 and nuts 22. The collected liquid contains oil and water. The collected liquid storage portion 50 is a box that is open upward. The bolts 21 and the nuts 22 configure a mounting and dismounting mechanism.

Also, a liquid communication portion 45 is fitted in the opening portion 16 of the bottom face of the housing 4. Liquid communication holes 46, which connect the interior of the housing 4 to the collected liquid storage portion 50, are formed in the liquid communication portion 45. The liquid communication portion 45 and the opening portion 16 configure the mounting and dismounting mechanism. Furthermore, a drain outlet 17, which discharges the collected liquid, is formed at part of a bottom face 51 of the collected liquid storage portion 50 close to the rear side 13.

Furthermore, an opening portion 18 is formed in the upper surface of the housing 4. The opening portion 18 is closed by a rectangular lid 19. A sealing sheet 20, which covers the entire opening portion 18, is sandwiched between the opening portion 18 and the lid 19. The lid 19, the sealing sheet 20, and the housing 4 are tightly secured by bolts 21 and nuts 22. The lid 19 restricts movement of members accommodated in the housing 4.

Figure 3:
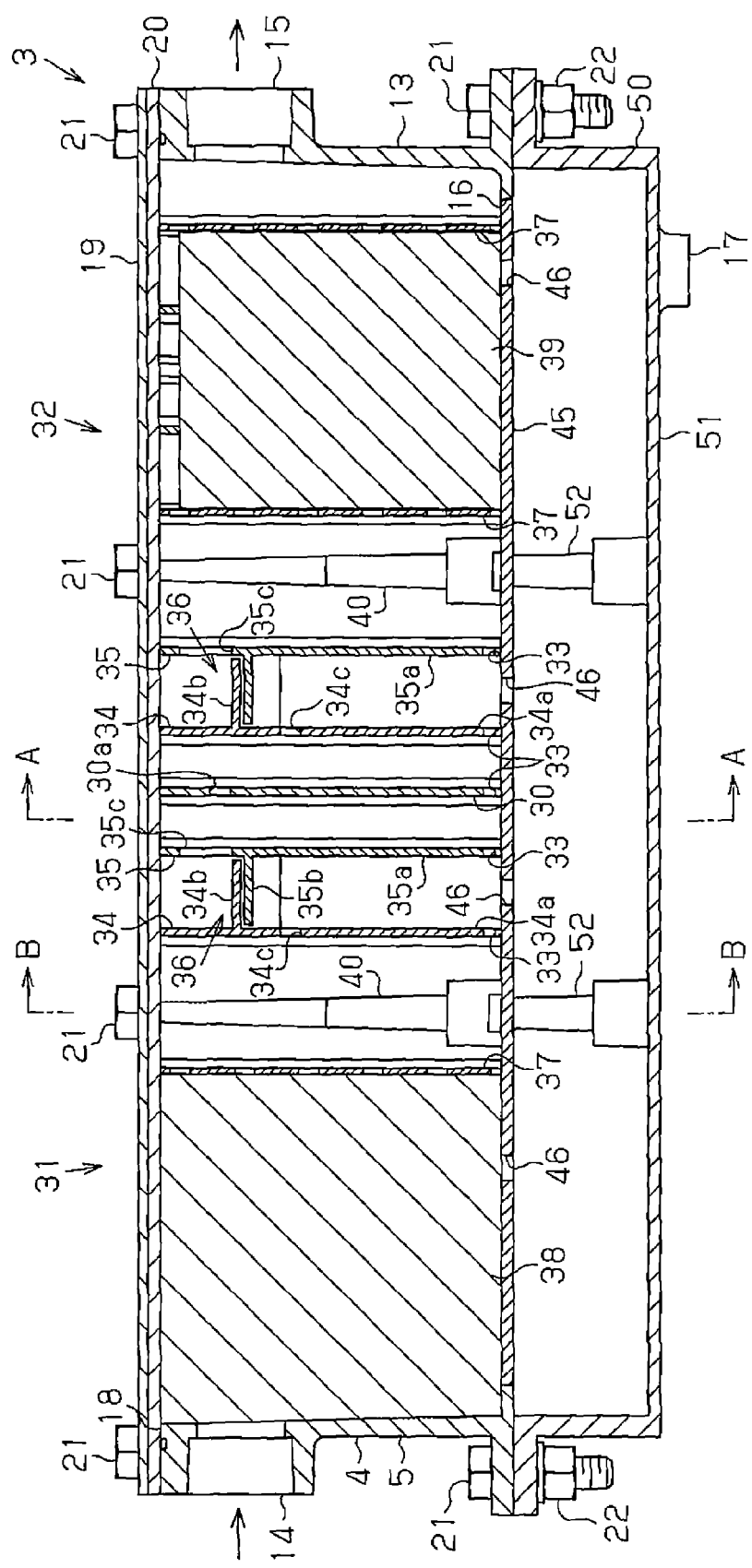
FIG. 3 is a vertical cross-sectional view illustrating the internal structure of the oil separator of FIG. 1.

As shown in FIG. 3, a plate-like partition wall 30 is provided at a longitudinal center portion in the housing 4. The inside of the housing 4 is divided by the partition wall 30 into a primary expansion chamber 31 close to the inlet 14 and a secondary expansion chamber 32 close to the outlet 15 in the horizontal direction. The transverse cross-sectional areas of the primary expansion chamber 31 and the secondary expansion chamber 32 are each greater than the transverse cross-sectional area of the inlet 14. The transverse cross-sectional area here corresponds to an area of a cross-section perpendicular to the longitudinal direction of the housing 4. Thus, since the air introduced into the expansion chambers expands, the flow velocity in the expansion chambers is reduced. Since the flow velocity of the air is reduced, the saturated vapor pressure is further reduced. This causes oil and water to easily condense, increasing the mass of particles of oil and water and allowing them to easily strike the impingement plates.

A through hole (orifice hole) 30a is formed at the upper section of the partition wall 30. Thus, the partition wall 30 functions as an orifice, which controls the flow of air from the primary expansion chamber 31 to the secondary expansion chamber 32 by the orifice hole 30a. Also, a communication hole 33 is formed at the lower section of the partition wall 30 in the vicinity of the opening portion 16. The communication hole 33 permits the collected liquid separated from the air and recovered to pass between the expansion chambers 31, 32.

Furthermore, impingement plates 34, 35, which are opposed to each other, are provided on both sides of the partition wall 30 in the housing 4. The first impingement plate 34 located toward the upstream end includes a first upright plate 34a, which extends from the opening portion 16 of the housing 4 to the lid 19, and a first baffle plate 34b, which extends perpendicularly from the first upright plate 34a in the longitudinal direction of the housing 4 toward the outlet 15. The first upright plate 34a includes a rectangular first through hole 34c, which extends in the widthwise direction of the impingement plates 34, 35, at a position lower than the joint to the first baffle plate 34b.

The second impingement plate 35 located toward the downstream end includes a second upright plate 35a, which extends from the opening portion 16 of the housing 4 to the lid 19, and a second baffle plate 35b, which extends perpendicularly from the second upright plate 35a in the longitudinal direction of the housing 4 toward the inlet 14. The second upright plate 35a includes a rectangular second through hole 35c, which extends in the widthwise direction of the impingement plates 34, 35 at a position upper than the joint to the second baffle plate 35b.

The first baffle plate 34b and the second baffle plate 35b project to obstruct the flow of air, and form an extremely narrow section 36. The extremely narrow section 36 is a narrow gap formed by arranging the wide surfaces of the first baffle plate 34b and the second baffle plate 35b close to each other. The first baffle plate 34b is located closer to the lid 19 than the second baffle plate 35b. The extremely narrow section 36 increases the flow velocity of the air and creates a meandering path, which further increases chances for oil and water particles to strike the plates. This causes the oil and the water to be further reliably separated from the air. Furthermore, since the baffle plates 34b, 35b are provided, the oil and the water that have dropped while passing between the first impingement plate 34 and the second impingement plate 35 are prevented from being lifted or stirred up by the air that passes between the first impingement plate 34 and the second impingement plate 35 and from being carried downstream through the second through hole 35c. Thus, the quantity of the collected liquid is prevented from being reduced. Communication holes 33 are each formed at the lower sections of the first impingement plate 34 or the second impingement plate 35 in the vicinity of the opening portion 16. The communication holes 33 allow the liquid that has been separated from the air and recovered to pass through the communication holes 33.

In the internal space of the primary expansion chamber 31, the pair of impingement plates 34, 35 is provided. A urethane foam 38 such as a sponge is located between the inlet 14 and the pair of impingement plates 34, 35. A punched metal plate 37 in which bores are formed is mounted on the side of the urethane foam 38 facing the impingement plate 34. The urethane foam 38 traps the oil and the water contained in the air.

The pair of impingement plates 34, 35 is also provided in the internal space of the secondary expansion chamber 32. A crushed aluminum member 39 is located between the pair of impingement plates 34, 35 and the outlet 15. Punched metal plates 37 in which bores are formed are respectively mounted on the surfaces of the crushed aluminum member 39 facing the impingement plates 34, 35 and the outlet 15. That is, the crushed aluminum member 39 is sandwiched between the pair of punched metal plates 37. The crushed aluminum member 39 traps the oil and the water contained in the air.

Ribs 40, which increase the strength of the housing 4, are each provided in the expansion chambers 31, 32. The collected liquid storage portion 50 is provided with four ribs 52 for increasing the strength. The liquid communication holes 46 of the liquid communication portion 45 are arranged such that each of the expansion chambers 31, 32 has two of the liquid communication holes 46, and the liquid communication holes 46 respectively correspond to the urethane foam 38, the impingement plates 34, 35, and the crushed aluminum member 39.

Figure 4:
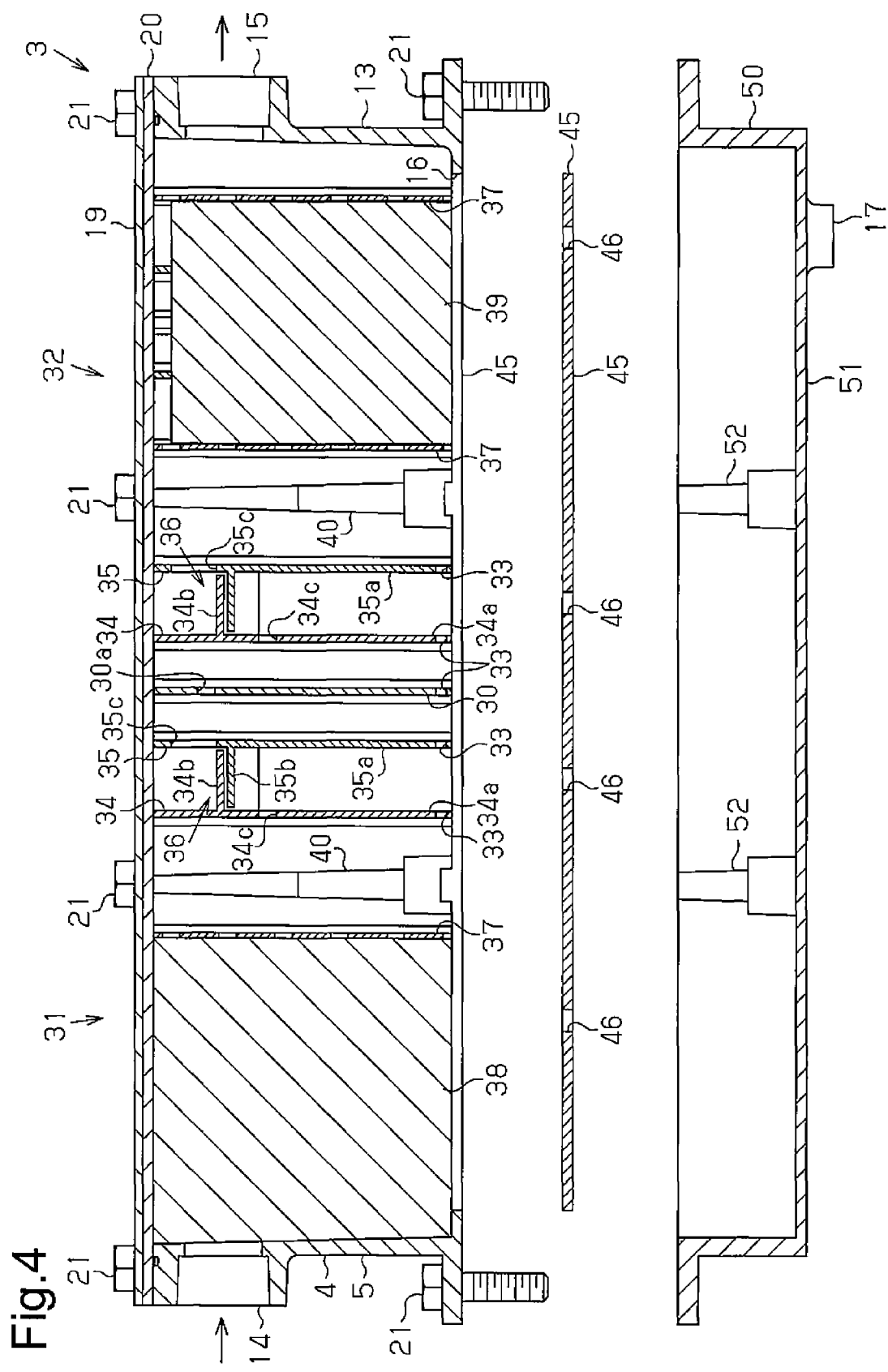
FIG. 4 is a vertical cross-sectional view illustrating a state in which the oil separator of FIG. 3 is disassembled.

As shown in FIG. 4, the liquid communication portion 45 and the collected liquid storage portion 50 are detachable with respect to the housing 4. That is, the liquid communication portion 45 is fitted to the opening portion 16 of the housing 4, and the collected liquid storage portion 50 is attached to the bottom face of the housing 4. Thus, the collected liquid stored in the liquid communication portion 45 and the collected liquid storage portion 50 is easily removed by dismounting the liquid communication portion 45 and the collected liquid storage portion 50 from the housing 4.

Figure 5:
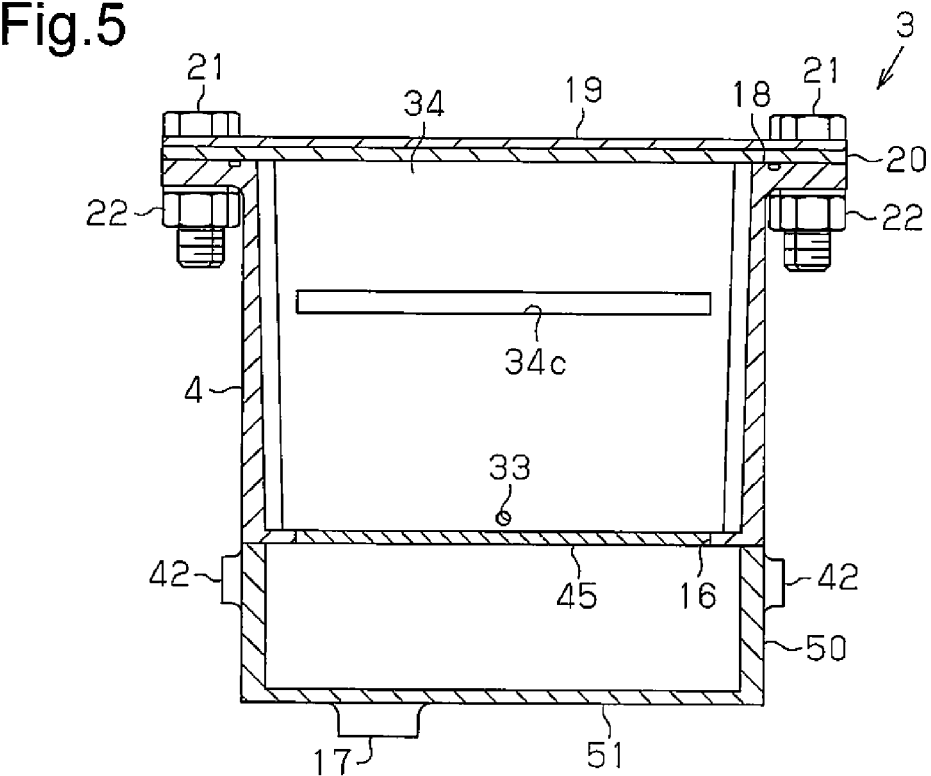
FIG. 5 is a cross-sectional view taken along line A-A of FIG. 3.

As shown in FIG. 5, the collected liquid storage portion 50, which is attached to the lower part of the housing 4, is hollow and is capable of storing collected liquid until the liquid level of the collected liquid reaches the lower surface of the liquid communication portion 45.

Figure 6:
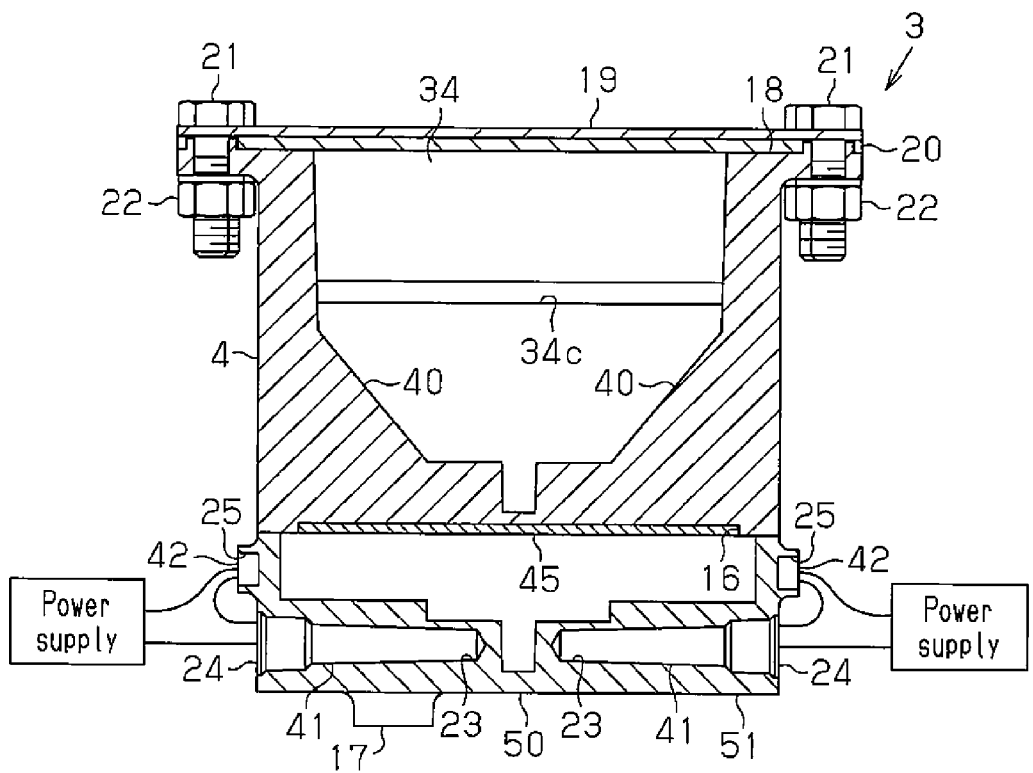
FIG. 6 is a cross-sectional view taken along line B-B of FIG. 3.

As shown in FIG. 6, columnar accommodation portions 23 for accommodating heating means, which are heaters 41 in this embodiment, are formed in each rib 52 of the collected liquid storage portion 50 close to the bottom face 51. Insertion openings 24 for inserting the heaters 41 are formed in the outer surface of the collected liquid storage portion 50. The insertion openings 24 are each connected to the associated accommodation portion 23. The heaters 41 are columnar and are each inserted in the associated accommodation portion 23 from the outer surface of the collected liquid storage portion 50. Each heater 41 is connected to a power supply.

Also, a mounting hole 25 for mounting a thermostat 42 is formed in the outer surface of the collected liquid storage portion 50 above each insertion opening 24. Each thermostat 42 is mounted to the associated mounting hole 25, and is connected to a power supply 43 and the associated heater 41. Each thermostat 42 detects the temperature of the collected liquid storage portion 50, and controls heating of the associated heater 41 based on the detected temperature. The water contained in the collected liquid that is stored at the bottom face of the collected liquid storage portion 50 is evaporated as much as possible by heating the collected liquid storage portion 50 with the heaters 41 so that liquid containing high concentration of oil is generated. Furthermore, by heating the housing 4 with the heaters 41, the oil separator 3 is prevented from getting into a situation where the collected liquid cannot be discharged through the drain outlet 17 due to freezing of the collected liquid in cold climate areas.

Operation of the above-mentioned oil separator will now be described.

The air introduced from the inlet 14 into the primary expansion chamber 31 passes through the urethane foam 38 while the oil and the water are trapped by the urethane foam 38, and then passes through the first through hole 34c of the first impingement plate 34 in the primary expansion chamber 31. At this time, the oil and the water that have struck the first upright plate 34a are separated from the air. The air that has passed through the first through hole 34c flows toward the extremely narrow section 36, which is formed by the first baffle plate 34b and the second baffle plate 35b, and passes through the extremely narrow section 36. At this time, the oil and the water that have struck the second upright plate 35a and the second baffle plate 35b are separated from the air.

The liquid that contains the water and the oil trapped by the urethane foam 38 moves through the urethane foam 38. The collected liquid drops through the liquid communication hole 46 that is located below the urethane foam 38 into the collected liquid storage portion 50, and is stored in the collected liquid storage portion 50. The liquid that has struck the first impingement plate 34 in the primary expansion chamber 31 and separated from the air passes through the communication hole 33 of the first impingement plate 34, drops through the liquid communication hole 46 located below the impingement plates 34, 35 into the collected liquid storage portion 50, and is stored in the collected liquid storage portion 50.

The air that has passed through the extremely narrow section 36 passes through the second through hole 35c of the second upright plate 35a toward the orifice hole 30a of the partition wall 30, and passes through the orifice hole 30a. At this time, the oil and the water that have struck the partition wall 30 are separated from the air. The liquid that has struck the second impingement plate 35 in the primary expansion chamber 31 and separated from the air passes through the communication hole 33 of the second impingement plate 35, drops through the liquid communication hole 46 located below the impingement plates 34, 35 into the collected liquid storage portion 50, and is stored in the collected liquid storage portion 50.

The air that has passed through the orifice hole 30a in the partition wall 30 passes through the first through hole 34c of the first upright plate 34a in the secondary expansion chamber 32. At this time, the oil and the water that have struck the first upright plate 34a are separated from the air. The air that has passed through the first through hole 34c flows toward the extremely narrow section 36, which is formed by the first baffle plate 34b and the second baffle plate 35b, and passes through the extremely narrow section 36. At this time, the oil and the water that have struck the second upright plate 35a and the second baffle plate 35b are separated from the air.

The liquid that has struck the partition wall 30 and separated from the air passes through the communication hole 33 in the partition wall 30 and the communication hole 33 of the first impingement plate 34 in the secondary expansion chamber 32, drops through the liquid communication hole 46 located below the impingement plates 34, 35 into the collected liquid storage portion 50, and is stored in the collected liquid storage portion 50.

The air that has passed through the extremely narrow section 36 passes through the second through hole 35c of the second upright plate 35a toward the crushed aluminum member 39, and passes through the crushed aluminum member 39. At this time, the air introduced into the crushed aluminum member 39 passes through the crushed aluminum member 39 while the oil and the water are further trapped by the crushed aluminum member 39, and cleaned air that does not contain oil is discharged to the outside from the outlet 15.

The liquid that has struck the first impingement plate 34 of the secondary expansion chamber 32 and separated from the air passes through the communication hole 33 of the first impingement plate 34, drops through the liquid communication hole 46 located below the impingement plates 34, 35 into the collected liquid storage portion 50, and is stored in the collected liquid storage portion 50. The liquid that has struck the second impingement plate 35 of the secondary expansion chamber 32 and separated from the air passes through the communication hole 33 of the second impingement plate 35, drops through the liquid communication hole 46 located below the impingement plates 34, 35 into the collected liquid storage portion 50, and is stored in the collected liquid storage portion 50. The liquid trapped by the crushed aluminum member 39 moves along the interior of the crushed aluminum member 39, and drops from the liquid communication hole 46 located below the crushed aluminum member 39 into the collected liquid storage portion 50, and is stored in the collected liquid storage portion 50.

The collected liquid stored in the collected liquid storage portion 50 is heated by the heater 41. This evaporates the water in the collected liquid. The collected liquid containing a high concentration of oil is discharged from the drain outlet 17. When removing the collected liquid stored in the collected liquid storage portion 50, the inside of the collected liquid storage portion 50 can be cleaned by dismounting the collected liquid storage portion 50 from the housing 4.

The first embodiment provides the following advantages.

(1) The collected liquid storage portion 50 is located below the expansion chambers 31, 32, which are connected to the collected liquid storage portion 50 via the liquid communication portion 45. This allows the separated oil and water to move from the liquid communication portion 45 to the collected liquid storage portion 50, which prevents the liquid stored in the storage portion 50 from being raised. Therefore, the separated oil and water is prevented from being caught by the passing air.

(2) Oil and water contained in air strikes the impingement plates 34, 35 to be removed from the air and also strikes the partition wall 30, which divides the expansion chambers 31, 32 from each other, to be separated from the air. If the partition wall 30 were not provided, only a small amount of oil and water would be separated from air in the primary expansion chamber 31, and a great amount of oil and water would be separated from air in the secondary expansion chamber 32. The partition wall 30, which is provided between the primary expansion chamber 31 and the secondary expansion chamber 32, allows the respective expansion chambers 31, 32 to evenly separate oil and water from air and store the oil and water.

(3) Since the expansion chambers 31, 32 have the liquid communication holes 46, the oil and water that has been separated from air in the expansion chambers 31, 32 is allowed to move to the collected liquid storage portion 50 via the liquid communication holes 46 and to be stored therein. Therefore, the oil and water that has been separated from air in the expansion chambers 31, 32 can be recovered and conducted to the collected liquid storage portion 50 without other expansion chambers in between.

(4) The mounting and dismounting mechanism including the bolts 21 and the nuts 22 allows the collected liquid storage portion 50 to be dismounted from the housing 4. Thus, the collected liquid storage portion 50 can be cleaned in a state dismounted from the housing 4. In particular, removal of oil is easy when oil is adhered to the inner wall of the collected liquid storage portion 50. Furthermore, using a disposable collected liquid storage portion 50 improves the ease of maintenance.

(5) The mounting and dismounting mechanism, which includes a fitting structure, allows the liquid communication portion 45 to be dismounted from the housing 4. Thus, the collected liquid communication portion 45 can be cleaned in a state dismounted from the housing 4. In particular, removal of oil is easy when oil is adhered to the inner wall of the liquid communication holes 46 of the liquid communication portion 45.

An oil separator according to a second embodiment will now be described with reference to FIGS. 8 to 14.

Figure 8:
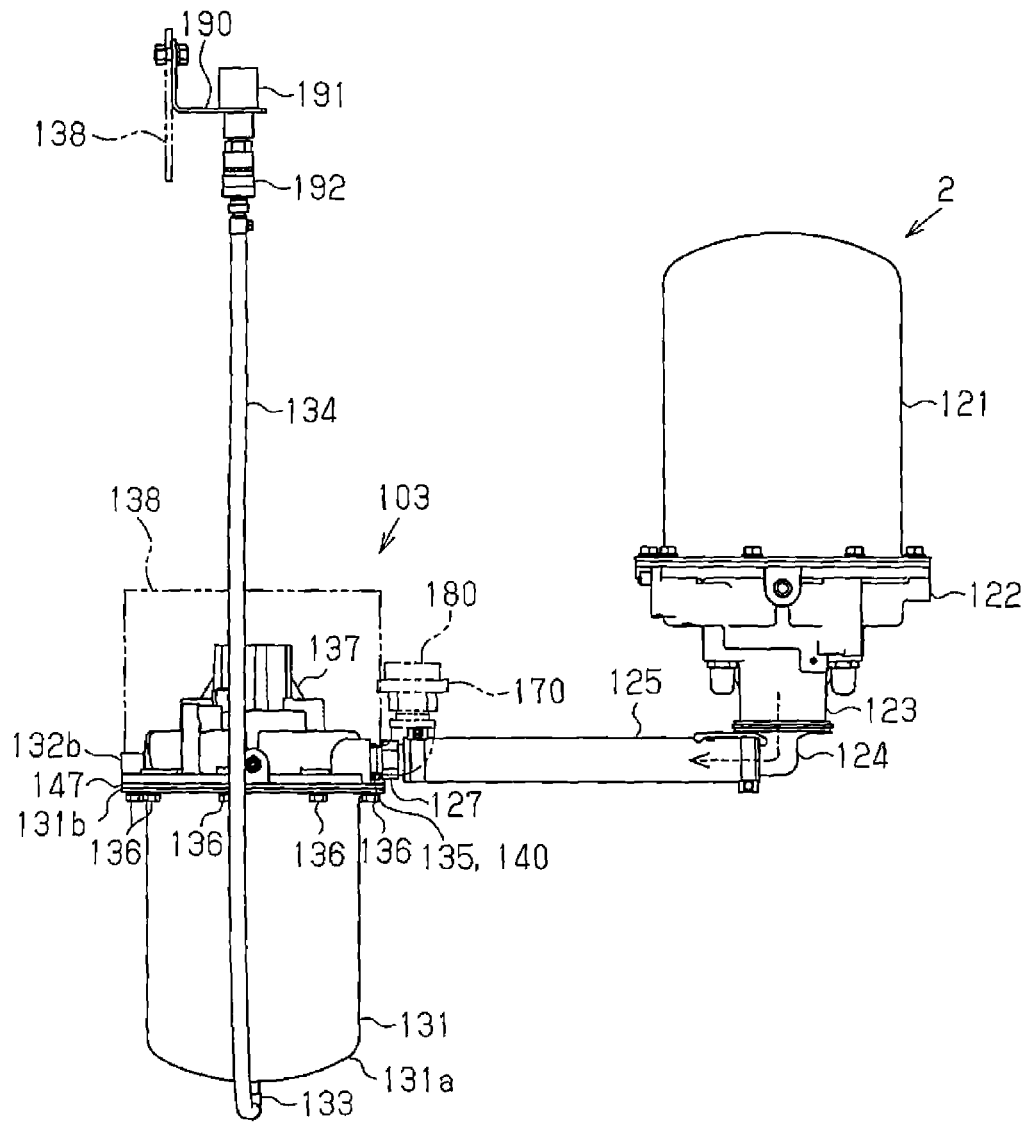
FIG. 8 is a view illustrating a mounting state of an oil separator according to a second embodiment of the present invention and a connection state of the oil separator and an air dryer.

As shown in FIG. 8, the air dryer 2 includes a cylindrical case 121 having a vertically upper end closed, and a support member 122, which closes the opening portion of the case 121 and supports the case 121. A purge air outlet 123, which discharges purge air during regeneration of a desiccant, is formed at the lower section of the support member 122. A purge air discharge cover 124, to which a connecting hose 125 is connected, is attached to the purge air outlet 123. The connecting hose 125 is connected to an oil separator 103. An inlet (not shown), which introduces compressed air compressed by the compressor 1, and an outlet (not shown), which discharges dried compressed air, are formed in the support member 122 of the air dryer 2.

The oil separator 103 includes a cylindrical housing having a closed end and extending in the vertical direction, which is a case 131 in this embodiment, and a lid 132, which closes the opening portion of the case 131. A drain outlet 133 for draining the collected liquid that has been stored is provided at a bottom portion 131a of the case 131. A drain hose 134, which is used when removing the collected liquid, is connected to the drain outlet 133. The lid 132 has an inlet 135 for introducing the purge air from the air dryer 2 through the connecting hose 125, and an outlet 140 for discharging cleaned air from which oil is separated. The inlet 135 and the outlet 140 are formed separately. The inlet 135 and the connecting hose 125 are connected to each other by a coupling member 127.

A mounting member 137 is formed integrally with the lid 132 of the oil separator 103 to extend upright from the lid 132. The mounting member 137 is secured to a chassis 138 with bolts 139.

The distal end of the drain hose 134 is detachably mounted to a support member 190, which is secured to, for example, the chassis 138 of a vehicle. That is, a securing member 191 is secured to the support member 190. A one-touch coupler 192 is secured to the lower end of the securing member 191. The one-touch coupler 192 allows the distal end of the drain hose 134 to be attached to the securing member 191 by a single operation. The drain hose 134 is secured to the securing member 191 by inserting the distal end of the drain hose 134 to the one-touch coupler 192, and is detached from the securing member 191 by manipulating the one-touch coupler 192. The distal end of the drain hose 134 is attached to the securing member 191 to face vertically upward.

An elbow member 160, which extends in the horizontal direction and bends vertically upward, is screwed to the outlet 140 of the oil separator 103. A drip preventing member 170 and a cover 180 for preventing entry of foreign matter are mounted on the distal end of the elbow member 160.

Figure 9:
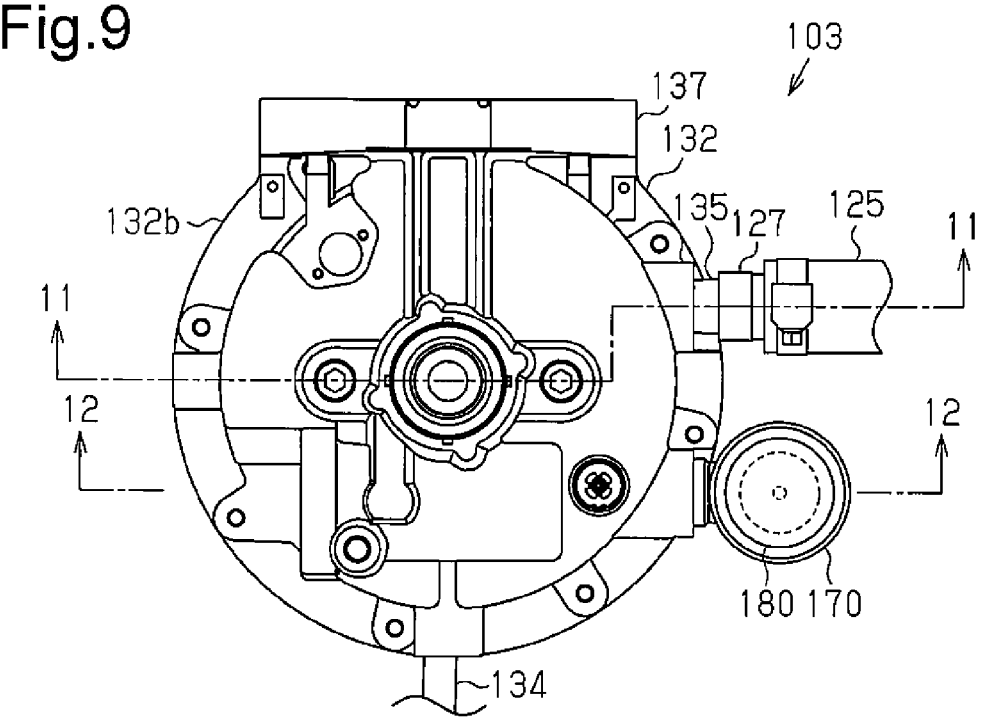
FIG. 9 is a top view illustrating the position of an inlet and an outlet of the oil separator of FIG. 8.
Figure 10:
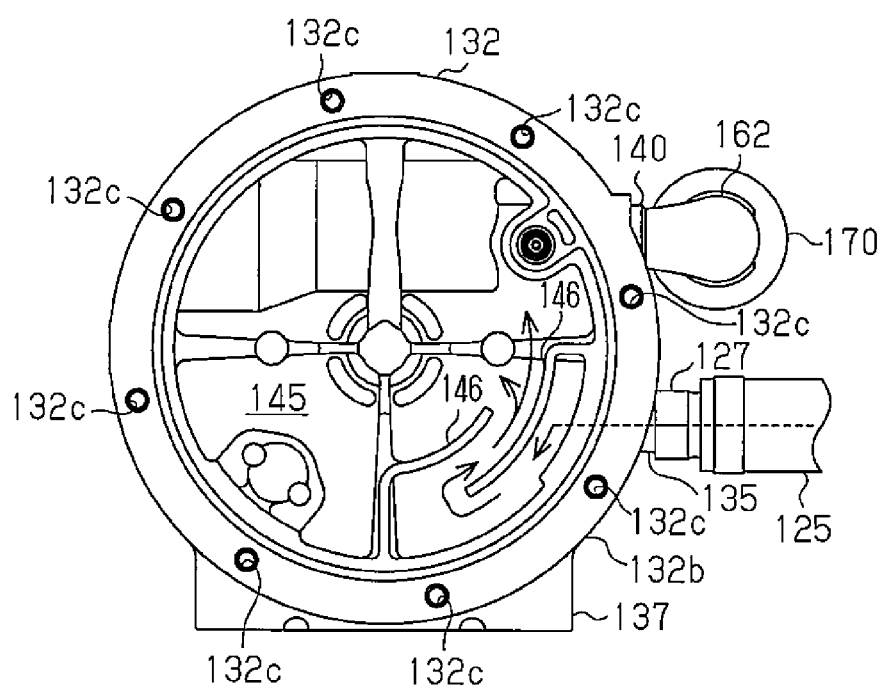
FIG. 10 is a bottom view illustrating the inside of the lid of the oil separator of FIG. 8.

As shown in FIGS. 9 and 10, the lid 132 has the inlet 135 and the outlet 140, which are open toward the same direction (rightward in the drawing). The inlet 135 and the outlet 140 are respectively provided on a horizontal surface. The connecting hose 125 is connected to the inlet 135 via the coupling member 127. The elbow member 160 is connected to the outlet 140. That is, the coupling member 127 and the elbow member 160 are arranged next to each other.

As shown in FIG. 10, the lid 132 is a cylinder having a vertically upper end closed. Two baffle plates 146 extend from the inner wall of the lid 132 in the vicinity of the inlet 135 to be perpendicular to the flow direction of the purge air introduced through the inlet 135. The internal space of the lid 132 functions as a first expansion chamber 145, which expands the purge air introduced from the inlet 135. The lid 132 has a communication section 132a, which connects the inside of the case 131 to the outlet 140.

Figure 11:
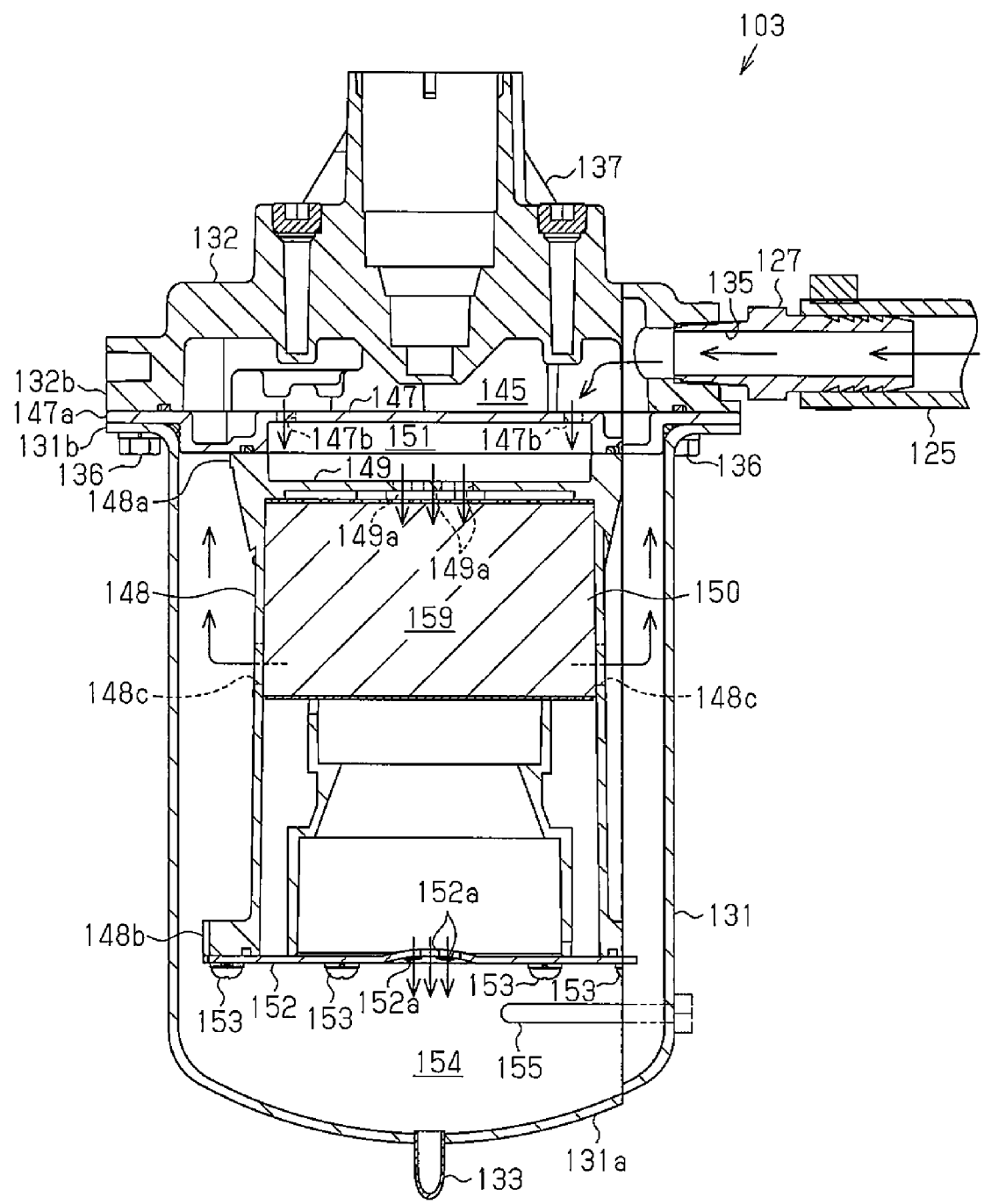
FIG. 11 is a cross-sectional view taken along line 11-11 of FIG. 9.
Figure 12:
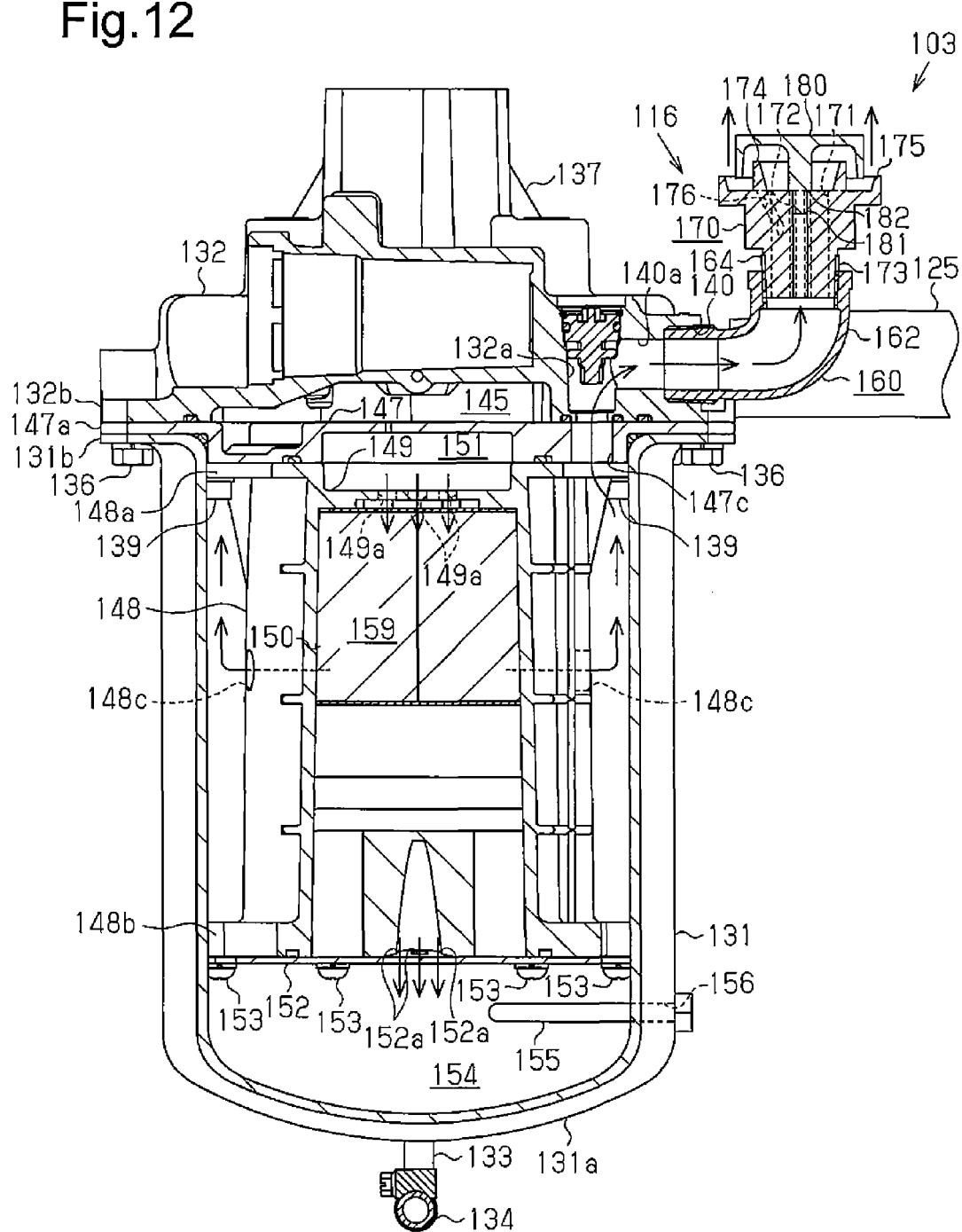
FIG. 12 is a cross-sectional view taken along line 6-6 of FIG. 9.

As shown in FIGS. 11 and 12, a disk-like cover 147, which closes the case 131 and the opening portion of the lid 132, is provided between the case 131 and the lid 132. The cover 147 and the case 131 are fastened to the lid 132 with bolts 136. That is, the bolts 136 are tightened to threaded bores 132c formed in a flange portion 132b provided on the lid 132. The bolts 136 and the threaded bores 132c function as the mounting and dismounting mechanism. Furthermore, threaded portions of the bolts 136 extend through through-holes formed in a flange portion 131b provided on the case 131. The cover 147 has through-holes through which the threaded portions of the bolts 136 extend. Thus, threaded portions of the bolts 136 extend through the through-holes of the flange portion 131b of the case 131 and the through-holes of a flange portion 147a of the cover 147. The bolts 136 are then screwed to the threaded bores of the flange portion 132b of the lid 132 so that the lid 132, the cover 147, and the case 131 are fastened together. The case 131 can be dismounted from the lid 132 by removing the bolts 136 form the threaded bores 132c. The cover 147 has a communication hole 147c, which connects the inside of the case 131 to the outlet 140.

The space formed by the lid 132 and the cover 147 functions as the first expansion chamber 145. A cylindrical accommodation member 148 having a vertically upper end closed is secured to the cover 147 with bolts 136. The accommodation member 148 accommodates a urethane foam 150 such as a sponge. The urethane foam 150 functions as an impingement member. A flange portion 148a and a flange portion 148b are formed at an upper edge and a lower edge of the accommodation member 148. The bolts 136 extend through the flange portion 148a formed at the upper edge of the accommodation member 148 so that the accommodation member 148 is tightened to the cover 147. The space formed by the cover 147 and upper surface of the accommodation member 148 functions as a second expansion chamber 151. The cover 147 has through holes 147b, which connect the first expansion chamber 145 to the second expansion chamber 151. Through holes 149a are formed at the center portion of an upper base 149 of the accommodation member 148. The through holes 147b of the cover 147 and the through holes 149a of the upper base 149 of the accommodation member 148 are formed at positions that are not opposed to each another. Through holes 148c are formed at the lower end of the side face of the accommodation member 148 to be spaced apart in the radial direction.

A disk-like support lid 152 is secured to the flange portion 148b, which is formed at the lower edge of the accommodation member 148, with screws 153. The disk-like support lid 152 supports the urethane foam 150 accommodated in the accommodation member 148. The inner diameter of the support lid 152 is substantially the same as the inner diameter of the case 131. The space formed by the upper base 149 of the accommodation member 148 and the support lid 152 functions as a third expansion chamber 159. The support lid 152 has through holes 152a, which permit the oil and the water removed by the urethane foam 150 to drop. Thus, the lower section in the case 131 functions as a collected liquid storage portion 154.

A heating means for evaporating water in the collected liquid by heating the stored collected liquid, which is a heater 155 in this embodiment, is arranged in the collected liquid storage portion 154. The heater 155 is inserted in the case 131 from an insertion hole 156 formed in the side face of the case 131. The heater 155 directly heats the collected liquid stored in the collected liquid storage portion 154. Heating of the heater 155 is controlled by a non-illustrated thermostat.

Figure 13:
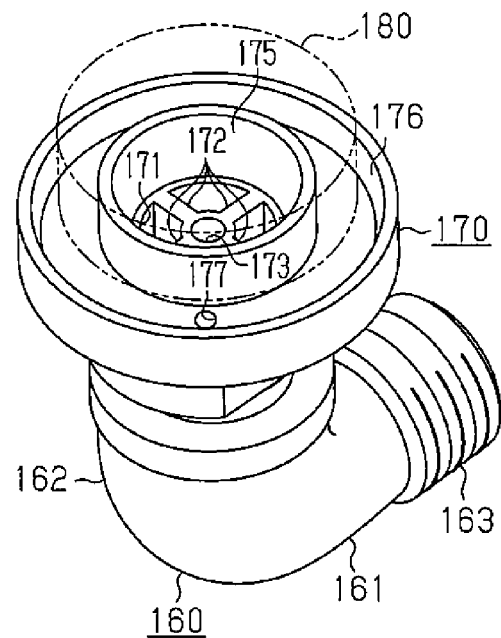
FIG. 13 is a perspective view illustrating the elbow member and the drip preventing member of FIG. 12.
Figure 14:
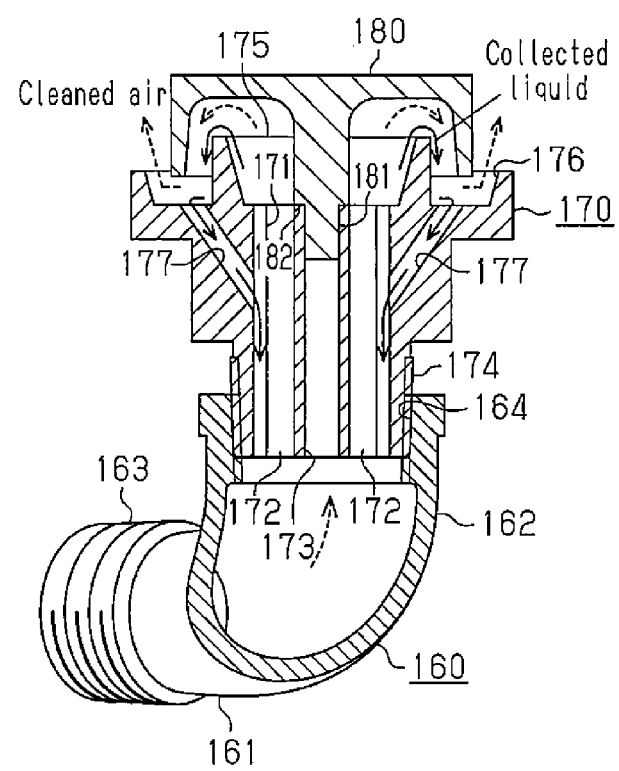
FIG. 14 is a cross-sectional view illustrating the internal structure of the elbow member and the drip preventing member of FIG. 13.

As shown in FIG. 13 and FIG. 14, the elbow member 160 includes a horizontal part 161, which extends in the horizontal direction, and a vertical part 162, which is continuous with the horizontal part 161 and extends in the vertical direction. An external thread portion 163, which is screwed to an internal thread portion 140a of the outlet 140, is formed at the proximal end of the elbow member 160. The external thread portion 163 of the elbow member 160 is formed such that tightening stops at a position where the distal end of the elbow member 160 faces upward when the external thread portion 163 is screwed to the internal thread portion 140a of the outlet 140. An internal thread portion 164, to which the drip preventing member 170 is screwed, is formed at the distal end of the elbow member 160. When the collected liquid flows into the elbow member 160, the vertical part 162 prevents the collected liquid from flowing to the outside.

A through hole 171, which connects the proximal end and the distal end of the drip preventing member 170, is formed inside the drip preventing member 170. Four division plates 172 are provided in the drip preventing member 170 to prevent large foreign matter from entering the passage and clogging the passage. The division plates 172 are formed to extend in the axial direction at equal intervals in the circumferential direction. A cylindrical portion 173 is formed at the center of the through hole 171 and at a position where the division plates 172 intersect one another. An external thread portion 174, which is screwed to the internal thread portion 164 of the elbow member 160, is formed at the proximal end of the drip preventing member 170. A drip pan 176, which receives liquid that drips from an opening portion 175, is formed on the side face of the opening portion 175 at the distal end of the drip preventing member 170 along the entire circumference. A return bore 177, which returns the liquid received by the drip pan 176 to the through hole 171, is formed at the bottom portion of the drip pan 176. The return bore 177 extends from the drip pan 176 to the through hole 171. Thus, the liquid that has dripped to the drip pan 176 returns to the elbow member 160 through the return bore 177.

A columnar insertion portion 181, which is inserted in the cylindrical portion 173 of the drip preventing member 170, projects from the inside of the cover 180. A step 182 is formed on the insertion portion 181. The step 182 determines the insertion position of the cover 180 with respect to the drip preventing member 170. The cover 180 covers the opening portion 175 of the drip preventing member 170. The outer diameter of the cover 180 is smaller than the inner diameter of the drip pan 176. Thus, the cleaned air that has passed through the drip preventing member 170 is discharged to the outside through the space between the opening portion 175 of the drip preventing member 170 and the inner surface of the cover 180.

Operation of the above-mentioned oil separator 103 will now be described.

As shown in FIG. 8, the purge air discharged from the air dryer 2 is introduced to the oil separator 103. The purge air contains oil and water.

As shown in FIG. 10, the purge air introduced through the inlet 135 strikes the baffle plates 146, is introduced into the oil separator 103 along the baffle plates 146, and expands in the first expansion chamber 145.

As shown in FIG. 11, the air expanded in the first expansion chamber 145 enters the second expansion chamber 151 via the through holes 147b formed in the cover 147. The air that has expanded in the second expansion chamber 151 enters the third expansion chamber 159 via the through holes 149a of the upper base 149 of the accommodation member 148. At this time, the oil and the water that have struck the urethane foam 150 are separated from the air. The liquid that contains the water and the oil trapped by the urethane foam 150 moves through the urethane foam 150. The liquid reaches the upper surface of the support lid 152, drops from the through holes 152a of the support lid 152 into the collected liquid storage portion 154, and is stored in the collected liquid storage portion 154. The liquid that has stored in the collected liquid storage portion 154 enters the drain hose 134 from the drain outlet 133. The collected liquid stored in the collected liquid storage portion 154 is heated by the heater 155. This evaporates the water in the collected liquid.

When the distal end of the drain hose 134 is detached from the securing member 191, the atmospheric air flows into the securing member 191, and the liquid in the drain hose 134 is located at the same level as the collected liquid in the collected liquid storage portion 154. Thus, the amount of the collected liquid in the collected liquid storage portion 154 can be checked by visually checking the liquid in the drain hose 134.

As shown in FIG. 12, oil and water are separated from the air that has entered the third expansion chamber 159 from the through holes 149a of the upper base 149 of the accommodation member 148. The air then enters the case 131 from the through holes 148c on the side face of the accommodation member 148. The air that has entered the case 131 passes through the communication hole 147c of the cover 147 and the communication section 132a of the lid 132, flows into the elbow member 160 through the outlet 140, and is discharged to the atmosphere. Thus, the air that has entered the case 131 hardly contacts the collected liquid in the collected liquid storage portion 154, and is discharged from the outlet 140. The air that is discharged from the outlet 140 is cleaned air that does not contain oil.

When discharging the collected liquid stored in the collected liquid storage portion 154, the distal end of the drain hose 134 is detached from the one-touch coupler 192 by manipulating the one-touch coupler 192, and the distal end of the drain hose 134 is held lower than the surface of the collected liquid in the collected liquid storage portion 154. In this manner, the collected liquid is discharged from the collected liquid storage portion 154.

When cleaning inside the case 131 or replacing the impingement member, which is the urethane foam 150 in this embodiment, the bolts 136 are removed from the threaded bores 132c to dismount the case 131 and the cover 147 from the lid 132. The dismounted case 131 and the cover 147 can be cleaned. Furthermore, the screws 153, which secure the support lid 152 to the accommodation member 148, are removed to take out the urethane foam 150 from the accommodation member 148, and the urethane foam 150 is replaced. After replacement, the support lid 152 is secured to the accommodation member 148 with the screws 153, and the bolts 136 are tightened to the threaded bores 132c of the lid 132 so that the case 131 and the cover 147 are mounted to the lid 132.

The second embodiment provides the following advantages.

(1) The inlet 135 and the outlet 140 are provided in the lid 132, and the purge air introduced into the case 131 through the inlet 135 moves vertically downward through the expansion chambers 145, 151, 159, and cleaned air is discharged from the outlet 140. The bolts 136 and the threaded bores 132c, which serve as the mounting and dismounting mechanism, allow the case 131 to be dismounted from and mounted to the lid 132. Thus, the housing is easily separated by dismounting the case 131 from the lid 132.

(2) The inlet 135 and the outlet 140 are formed on a horizontal surface of the lid 132. Since the inlet 135 and the outlet 140 are not formed in the case 131, no tubes are connected to the case 131. Thus, it is easy to dismount the case 131 from the lid 132. Also, since no tubes are connected to the upper surface or the bottom face of the lid 132 in the vertical direction, the vertical length is prevented from being increased.

(3) The heater 155 is inserted through the insertion hole 156, which is provided at the lower section of the case 131, and the heater 155 directly heats the collected liquid. Thus, the amount of collected liquid is reduced by evaporating the water contained in the collected liquid. This reduces the number of times the case 131 is dismounted from the lid 132, and extends the life of the mounting and dismounting mechanism. Furthermore, heat transfer from the heater 155 to the collected liquid is high, and the collected liquid is efficiently heated as compared to a case in which the collected liquid is indirectly heated.

The above described embodiments may be modified as follows.

In the first embodiment, the sealing sheet 20 is provided between the opening portion 18 of the housing 4 and the lid 19, but the sealing sheet 20 may be omitted. It is desirable that the sealing between the opening portion 18 of the housing 4 and the lid 19 be maintained.

In the first embodiment, the baffle plates 34b, 35b, which extend to be perpendicular to the upright plates 34a, 35a, are provided. However, as long as the extremely narrow section 36 is maintained, the baffle plates 34b, 35b do not necessarily have to be formed to be perpendicular to the upright plates 34a, 35a.

In the first embodiment, the extremely narrow section 36 configured by the pair of baffle plates 34b, 35b is provided. However, an extremely narrow section formed by multiple pairs of baffle plates may be provided.

In the first embodiment, the communication hole 33 is formed at the lower section of the partition wall 30. However, if the drain outlet 17 is formed in each of the expansion chambers 31, 32, the communication hole 33 of the partition wall 30 may be omitted.

In the first embodiment, the lid 19 restricts the movement of the impingement plates 34, 35, the partition wall 30, the urethane foam 38, and the crushed aluminum member 39. However, as long as the impingement plates 34, 35, the partition wall 30, the urethane foam 38, and the crushed aluminum member 39 are secured, the lid 19 does not necessarily have to restrict their movement.

In the first embodiment, the crushed aluminum member 39 is provided in the secondary expansion chamber 32, but the urethane foam 38 may be provided instead of the crushed aluminum member 39.

In the first embodiment, members are arranged in the housing 4 in the order of the urethane foam 38, the impingement plates 34, 35, the partition wall 30 (the orifice hole 30a), the impingement plates 34, 35, and the crushed aluminum member 39. However, the arrangement of the members may be changed, some of the members may be omitted, some of the members may be increased, or a member may be changed depending on the amount of oil and water discharged from the air dryer 2 (the compressor 1).

In the first embodiment, providing the liquid communication holes 46 at positions where the urethane foam 38 and the crushed aluminum member 39 contact the liquid communication portion 45 promotes dropping of the collected liquid, and prevents the collected liquid from being raised up to the expansion chambers 31, 32.

In the first embodiment, the expansion chambers 31, 32 are arranged next to each other in the horizontal direction, but may be arranged next to each other in the vertical direction.

In the first embodiment, the inlet 14 is formed in the front side 5, and the outlet 15 is formed in the rear side. However, if there is a sufficient space in the vertical direction, the inlet 14 and the outlet 15 may be formed in the lid 19 on the top face or the opening portion 16.

In the first embodiment, the heaters 41 are provided in the ribs 52, but the heaters 41 may be provided at positions other than the ribs 52.

In the configuration of the first embodiment, the number of the heater 41 may be changed as required.

In the first embodiment, the size, or the capacity, of the primary expansion chamber 31 and the secondary expansion chamber 32 is substantially the same. However, the capacity of the secondary expansion chamber 32 may be greater than the capacity of the primary expansion chamber 31. In this case, the saturated vapor pressure in the secondary expansion chamber 32 is further reduced, allowing the oil and the water to easily condense. This increases the mass of particles of the oil and the water, allowing them to easily strike the impingement plate. Thus, the secondary expansion chamber 32 stores more oil and water separated from the air than the primary expansion chamber 31.

Figure 7:
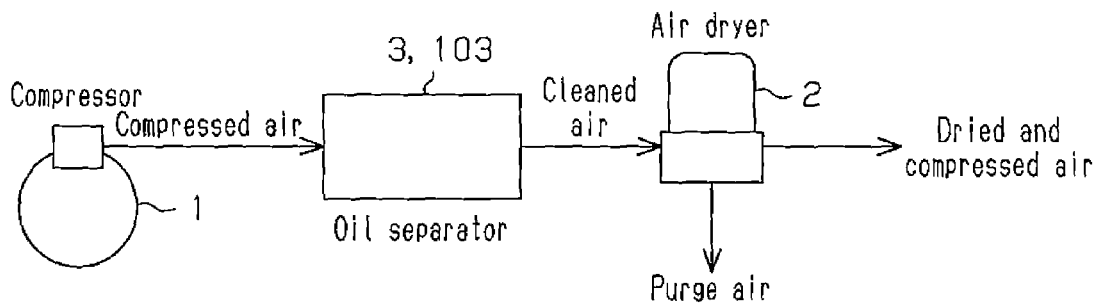
FIG. 7 is a block diagram illustrating an installation position of an oil separator according to a modification in an air system.

In the first and second embodiments, the oil separators 3, 103 are provided in the exhaust system of the air dryer 2, which is downstream of the compressor 1 of the air system. However, as shown in FIG. 7, the oil separators 3, 103 may be provided downstream of the compressor 1 of the air system and upstream of the air dryer 2. In this case, oil and water are separated from the air containing lubricant in the compressor 1, and cleaned air is supplied to the air dryer 2. Thus, the desiccant in the air dryer 2 is prevented from being deteriorated due to the oil.

In the first and second embodiments, the oil separators 3, 103 are provided in the air system including the air dryer 2 in a vehicle such as trucks, buses, and construction machines. However, the oil separators 3, 103 may be used in any situation as long as these are for use in separating oil from air containing oil and water. For example, the oil separator may clean exhaust gas to the atmosphere from an air dryer that dries compressed air in, for example, a plant.

Figure 15:
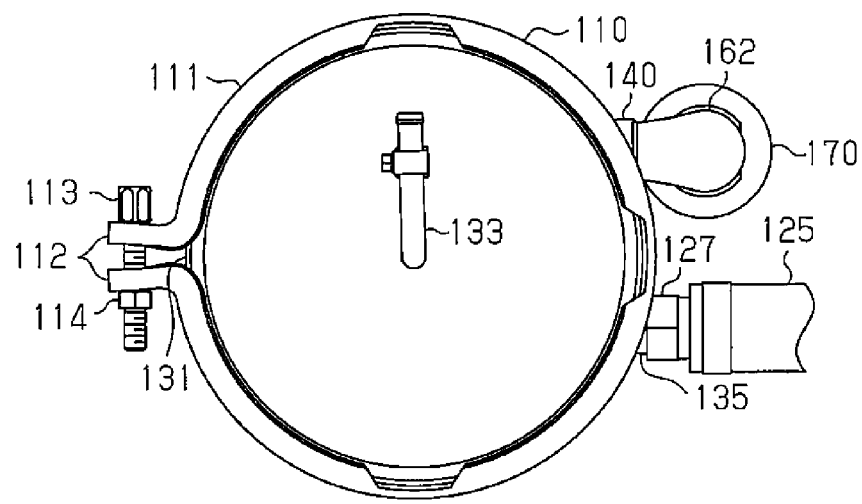
FIG. 15 is a bottom view illustrating a mounting and dismounting mechanism of an oil separator according to a modification.
Figure 16:
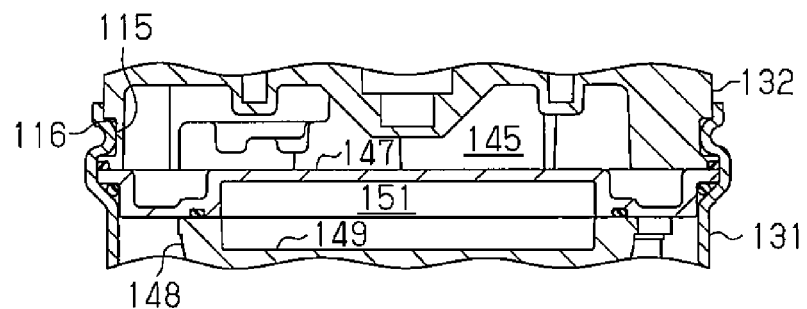
FIG. 16 is a cross-sectional view illustrating the mounting and dismounting mechanism the oil separator according to the modification.

In the second embodiment, as the mounting and dismounting mechanism, the bolts 136 are tightened to the threaded bores 132c. However, other mounting and dismounting mechanisms may be employed. For example, as shown in FIG. 15, a clamp ring 110 may be employed as the mounting and dismounting mechanism. The clamp ring 110 sandwiches the flange portion 132b of the lid 132 and the flange portion 131b of the case 131 and tightens radially inward. The clamp ring 110 includes a ring 111, which has a U-shaped cross-section and sandwiches the flange portions 132b, 131b, a bolt 113, which tightens tightening portions 112 of the ring 111, and a nut 114. If the clamp ring 110 is employed, the case 131 is easily mounted and dismounted by only turning the bolt 113. Also, as shown in FIG. 16, a recess-projection fitting structure may be employed as the mounting and dismounting mechanism. Instead of the flange portion 131b of the case 131, a projection 115, which projects inward of the case 131, is provided in the circumferential direction, and instead of the flange portion 132b of the lid 132, a recess 116 is provided. The case 131 is pressed toward the lid 132 so that the projection 115 of the case 131 is fitted to the recess 116 of the lid 132. The recess may be provided in the case 131, and the projection may be provided on the lid 132. If the recess-projection fitting is employed, the case 131 is mounted on the lid 132 only by fitting. Thus, the case 131 is easily mounted and dismounted. Furthermore, a locking screw may be provided to prevent rotation of the case 131 with respect to the lid 132.

Figure 17:
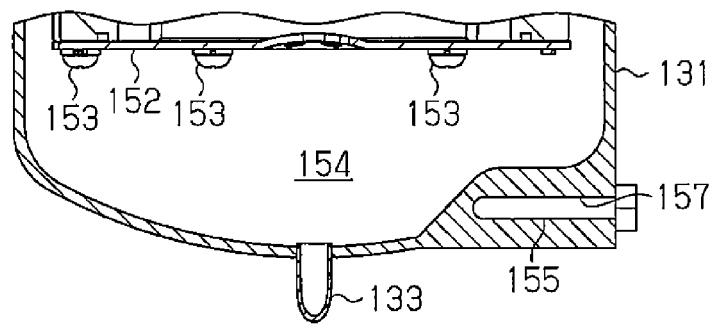
FIG. 17 is a cross-sectional view illustrating the structure of the lower part of the oil separator according to a modification.

In the second embodiment, the collected liquid is directly heated by inserting the heater 155 through the insertion hole 156 into the collected liquid storage portion 154. However, as shown in FIG. 17, an accommodation portion 157, which accommodates the heater 155, may be formed in the case 131, and the case 131 may be heated. In this case, the water contained in the collected liquid is evaporated, and the amount of collected liquid is reduced. This reduces the number of times the case is removed from the lid, and thus extends the life of the mounting and dismounting mechanism. Also, since the heater 155 does not contact the collected liquid, the heater is prevented from being deteriorated due to the collected liquid.

In the second embodiment, the inlet 135 and the outlet 140 are respectively provided on a horizontal surface of the lid 132, but the inlet 135 and the outlet 140 may be provided on the surface facing in the vertical direction such as an upper section of the lid 132.

In the second embodiment, the drain hose 134 is connected to the drain outlet 133 of the case 131. However, the drain hose 134 may be omitted, and the collected liquid may be directly discharged from the drain outlet 133. In this case, the drain outlet 133 is provided with a collected liquid flow prevention member.

In the second embodiment, the first expansion chamber 145, the second expansion chamber 151, and the third expansion chamber 159 are provided in the oil separator 103. However, at least one of the first expansion chamber 145, the second expansion chamber 151, and the third expansion chamber 159 may be employed.

In the second embodiment, the drain hose 134 may be calibrated.

In the second embodiment, a member such as a nonwoven fabric filter may be provided upstream or downstream of the urethane foam 150, or in the expansion chambers 145, 151. In this case, the removal rate of the oil component is increased. Furthermore, the urethane foam 150 such as a sponge or a member such as a nonwoven fabric filter may be charged with static electricity. The members can be charged with static electricity by a method such as utilizing the flow of dried air from the dryer. Also, the urethane foam 150 such as a sponge and the member such as a nonwoven fabric filter may be formed of material that is electrically charged from the beginning. In this case, the removal rate of the oil component is further increased.

In the second embodiment, the urethane foam 150 is employed as the impingement member, but other members such as a crushed aluminum member may be employed. Furthermore, instead of the expansion chamber having the impingement member, just an expansion chamber without the impingement member may be employed.

The invention claimed is:

1. A system comprising:
a compressor configured to compress air and to supply compressed air;
an air dryer configured to dry the compressed air supplied from the compressor and to supply dried compressed air, the air dryer comprising a supplying line for supplying the dried compressed air and an exhaust line for discharging purge air; and
an oil separator connected to the exhaust line, the oil separator comprising:
a housing including an inlet for introducing the purge air from the air dryer; and
an expansion chamber provided in the housing, wherein
the oil separator is configured to introduce the purge air into the housing through the inlet to separate and recover the oil from the introduced purge air,
the transverse cross-sectional area of the expansion chamber is greater than the opening area of the inlet, and
the oil separator further includes
a collected liquid storage portion located below the expansion chamber, wherein the collected liquid storage portion is configured to store the separated oil,
a liquid communication portion having a communication hole that connects the expansion chamber and the collected liquid storage portion with each other, and
a mounting and dismounting mechanism for mounting the collected liquid storage portion to and dismounting the collected liquid storage portion from the housing.

2. The system according to claim 1, wherein
the expansion chamber is a first expansion chamber among a plurality of expansion chambers,
the first expansion chamber has an impingement plate,
the oil separator is configured to cause the introduced purge air to strike the impingement plate to separate oil from the introduced purge air, thereby recovering the oil, and
the plurality of expansion chambers are divided from each other by a partition wall.

3. The system according to claim 2, wherein each expansion chamber of the plurality of expansion chambers has a communication hole.

4. The system according to claim 1, wherein the liquid communication portion is configured to be detachable with respect to the housing.

5. An oil separator comprising:
a lid including an inlet for introducing purge air from an air dryer and an outlet for discharging cleaned air;
a plurality of expansion chambers arranged next to one another in a vertical direction;
a housing mountable to the lid; and
a mounting and dismounting mechanism for allowing the lid to be detachable with respect to the housing, wherein
the oil separator causes the purge air to flow into the housing and strike an impingement member to separate oil from the purge air, thereby recovering liquid containing oil, and the oil separator discharges cleaned air, and
a through hole, which permits the purge air introduced through the inlet to flow vertically downward, is formed between the expansion chambers.

6. The oil separator according to claim 5, wherein the inlet and the outlet are provided on a horizontal surface of the lid.

* * * * *